E. HURLBRINK.
APPARATUS FOR DISCHARGING LIQUIDS.
APPLICATION FILED NOV. 22, 1913.
1,243,298.
Patented Oct. 16, 1917.
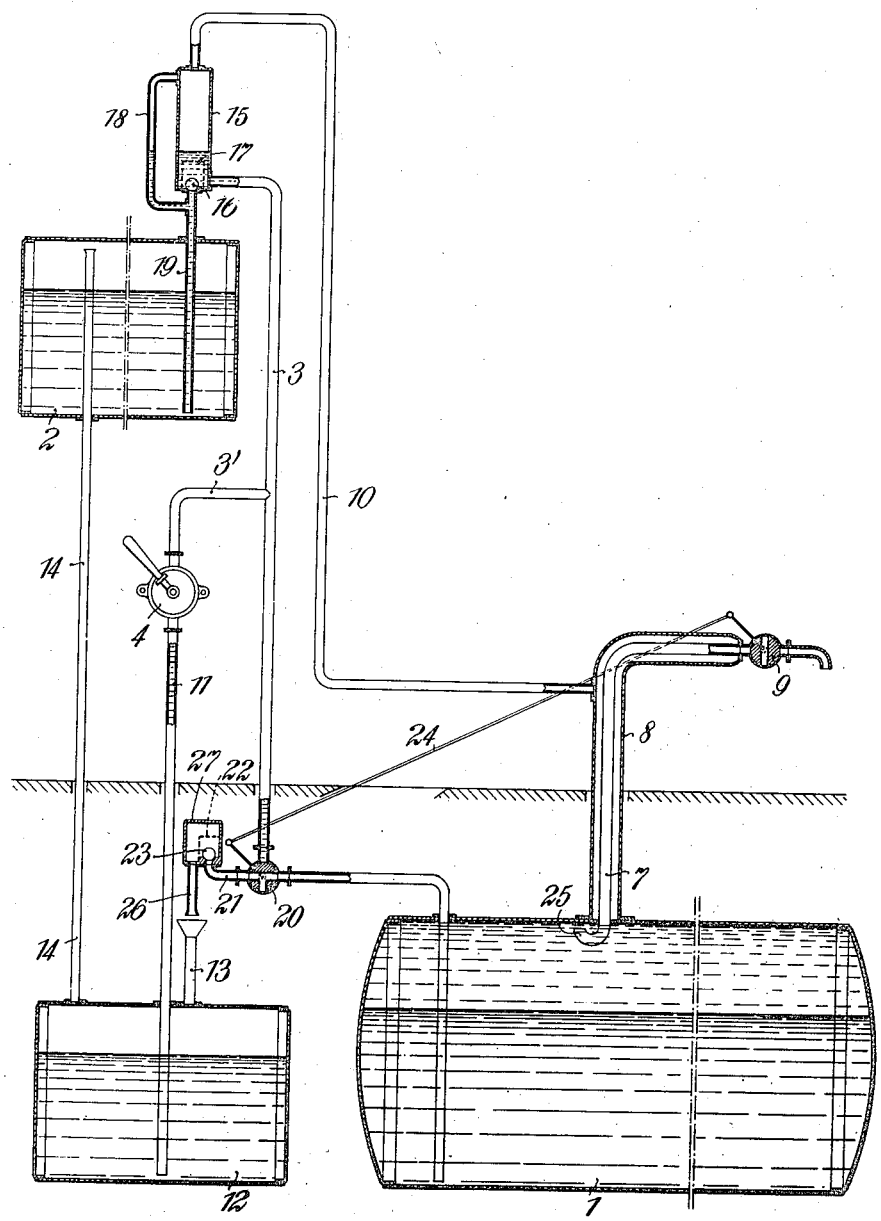
Witnesses:
Inventor
Ernst Hurlbrink
by John Lotka
Attorney.

UNITED STATES PATENT OFFICE.

ERNST HURLBRINK, OF FRIEDENAU, BERLIN, GERMANY, ASSIGNOR TO MARTINI & HÜNEKE MASCHINENBAU-AKTIEN-GESELLSCHAFT, OF BERLIN, GERMANY, A CORPORATION OF GERMANY.

APPARATUS FOR DISCHARGING LIQUIDS.

1,243,298.  Specification of Letters Patent.  Patented Oct. 16, 1917.

Application filed November 22, 1913. Serial No. 802,368.

*To all whom it may concern:*

Be it known that I, ERNST HURLBRINK, a subject of the German Emperor, and a resident of Friedenau, Berlin, Germany, have invented certain new and useful Improvements in Apparatus for Discharging Liquids, of which the following is a specification.

My invention relates to apparatus for discharging liquids, and particularly inflammable liquids such as gasolene, with the aid of water or other liquid inert relatively to the liquid to be discharged. My present invention has particular reference to that type of apparatus in which the water or other pressure-exerting liquid is drawn by siphon action from an elevated receptacle into the tank containing the gasolene or other liquid to be discharged. The object of my invention is to provide an improved apparatus embodying this siphon principle, so constructed as to afford increased safety against the accidental escape of the gasolene or other inflammable liquid.

I will now proceed to describe, as an example, the specific embodiment of my invention shown in the accompanying drawing, which is an elevation of such apparatus, with parts in section. The novel features of the invention will then be pointed out in the appended claims.

The gasolene tank 1, preferably buried underground, has its lower portion connected with the elevated water tank 2 by a connecting pipe 3, it being understood that the pipe 19 which constitutes one end of the pipe 3 dips into the water contained in the tank 2 so that the said pipe 19 with the adjacent portion of the main part of the pipe 3 forms a siphon pipe. The lower portion of the tank 1 is normally filled with water, into which dips the lower end of the pipe 3, while the gasolene or other liquid to be discharged is contained in the upper portion of the tank 1. The gasolene is adapted to be withdrawn through the outlet pipe 7, having a cock or faucet 9 at its discharge end. A jacket pipe 8 surrounds the discharge or outlet pipe 7 exteriorly of the tank 1, the lower end of said jacket pipe being closed by the top wall of the tank, that is to say, the jacket chamber does not communicate with the gasolene space of the tank. At a point between the tanks 1 and 2, the connecting pipe 3 has a branch 3' leading to the delivery port of a suitable pump 4, the suction port of which is connected with a pipe 11 whose lower end dips into the water contained in a lower water tank 12, preferably buried in the ground, as shown. From the top of the tank 12 leads a pipe 13 having a funnel-shaped upper end open to the surrounding air. Atmospheric pressure will therefore prevail within the tank 12, and also in the tank 2, since the upper spaces of these two tanks are connected by a pipe 14. The tank 2 is closed except for its connections with the pipes 14 and 19.

The upper portion of the pipe 3, at the bend of the siphon, enters an enlargement or air-chamber (vacuum chamber) 15, containing a non-return valve 16 controlling a connection of said chamber with the pipe 19 and tank 2. A by-pass 18 however connects the upper portion of chamber 15 with the pipe 19, below the valve 16. The latter is shown as a ball-valve held within a perforated cage 17. A pipe 10 connects the upper portion of the chamber 15 with the jacket space of the pipe 8.

At a level slightly above the tank 1 a three-way cock 20 is arranged in the connecting pipe 3, the plug of said cock being operatively connected with the plug of the discharge cock or faucet 9, as by a rod 24. In the position shown, the three-way cock connects the lower portion of the pipe 3 with the alining pipe 21 which leads to a chamber 27 containing a perforated cage 22 for retaining the ball-valve 23 controlling the connection of the pipe 21 with the chamber 27. An outlet pipe 26 leads from the chamber 27 to a point directly above the funnel-shaped upper end of the pipe 13. The intake end of the outlet pipe 7, within the tank 1, is preferably given a U-shape, as shown at 25, for a purpose stated hereinafter.

When the apparatus is to be started, water is transferred, by operating pump 4, from the lower receptacle 12 to the connecting pipe 3, until such water fills not only said pipe, including the siphon bend thereof, but the chamber 15 and the by-pass 18 as well.

When the level of the water in the chamber 15 reaches the upper end of the by-pass pipe 18, the water will begin to overflow into the said pipe 18 and through the pipe 19 into the tank 2, and as the connected upper portions of said pipe 18 and of the chamber 15 constitute a siphon, the siphon action in said upper portions will withdraw a certain amount of water from the chamber 15, so that the water level will drop from the upper end of the pipe 18, say to the level indicated in the drawing. This fall of the water level will produce a partial vacuum in the upper portion of the chamber 15 and in the spaces (upper portion of pipe 18, and all of the pipe 10 and jacket 8) which are connected with the upper portion of the said vacuum chamber 15. This partial vacuum will greatly assist the starting of the siphon action through 19, 16, 3 which takes place when the faucet 9 is opened, as will be described presently. The advantage of drawing the water from a separate tank such as 12, and not from the gasolene tank 1, consists in avoiding the danger of having air enter the tank 1 as water is withdrawn therefrom and of having such air come in contact and mix with the gasolene in the tank 1.

If now the discharge cock or faucet 9 is opened, this will cause the three-way cock 20 to take a position in which it connects the upper portion of the pipe 3 with its lower portion and therefore with the tank 1. Water will then pass from the chamber 15 through the pipe 3 into the tank 1, forcing a corresponding amount of gasolene into the outlet pipe 7. This causes a siphon action by which the ball-valve 16 is raised and water is sucked from the elevated tank 2 up the pipe 19 and into the pipe 3 and tank 1, as long as the discharge cock 9 is open. It is not necessary to operate the pump 4 except when starting the apparatus for the first time after it has been installed, since the siphon action, when once brought about as described, will be preserved for a considerable time.

The lowering of the water level in the chamber 15 owing to the flow of water from the tank 2 to the tank 1 causes a partial vacuum, or reduction of pressure in the upper portion of the chamber 15, and consequently in the pipe 10 and jacket 8. This is a useful feature, because in the event of a break or leak in the jacket pipe 8, air will be drawn in through the crank or opening, destroying the partial vacuum and breaking the siphon action. Thus, if a break or leak should develop in the jacket 8, the discharge of gasolene from the cock 9 will stop because the interruption of the siphon action will arrest the passage of water from the tank 2 to the tank 1.

When the discharge cock 9 is closed, the operative connection 24 will bring the three-way cock 20 back to the position shown in the drawing, in which the upper portion of the pipe 3 is no longer connected with the tank 1, but the latter is placed in communication with the outside air through the pipe 21, chamber 27, and pipe 26. Thus the escape of gasolene from the cock 9 will be prevented absolutely, even if such cock should leak when closed.

If the pipe 21 were connected directly with the surrounding air, instead of interposing a non-return valve (such as 23) in this connection, there would be danger that, in case of fire, some of the water used to extinguish the fire might enter the tank 1 through the pipe 21 and the lower portion of the pipe 3 (with the three-way cock 20 in the normal position shown), causing gasolene to be forced out through the outlet pipe, in case the latter has been melted by the heat of the conflagration. The valve 23 however prevents such entrance of water and thus affords an additional safeguard against the escape of gasolene in case of fire.

The U-shaped bend 25 at the intake end of the outlet pipe 7 is another expedient provided by me to increase the safety of the apparatus in case of fire. When the pipe 7 has been melted by fire, so that water used for extinguishing the fire might have access to the interior of the tank 1 through said pipe 7 and expel gasolene, the U-shaped end 25 will act to prevent the escape of gasolene, thus avoiding the danger just mentioned. If the pipe 7 had the end which is located within the receptacle 1, provided with a downwardly directed opening in the gasolene space of said receptacle or tank, the water flowing down said pipe in the case referred to, would fall into the water space of the tank, and by causing the water level to rise, would expel some gasolene through the broken upper portion of the pipe.

Various modifications may be made without departing from the nature of my invention as set forth in the appended claims.

I claim as my invention:

1. The combination of a storage tank for inflammable liquids, an elevated tank adapted to contain an inert liquid and located at a higher level than said storage tank, a pipe connecting said tanks and provided with a siphon bend rising above the second named tank, a third tank adapted to contain an inert liquid, and a pump having a suction connection to the said third tank and a delivery connection to a point of said pipe between the two tanks which it connects.

2. The combination of a storage tank for inflammable liquids, a second tank adapted to contain an inert liquid, a pipe connecting said tanks, and provided with a chamber adjacent to said second tank, a non-return valve controlling a connection from said chamber to the adjacent tank, a by-pass extending from said chamber around the valve, an outlet pipe through which the inflammable liquid may be discharged from the storage tank, a jacket surrounding said outlet pipe, a connection from said jacket to the aforesaid chamber, and means for filling the pipe which connects said tanks.

3. The combination of two tanks adapted to contain an inflammable liquid and an inert liquid respectively, a pipe connecting said tanks and provided with a chamber adjacent to the second tank, a non-return valve controlling a connection from said chamber to the adjacent tank, a by-pass extending from said chamber around the valve, an outlet pipe through which the inflammable liquid may be discharged from the tank containing it, a jacket surrounding said outlet pipe, and a connection from said jacket to the aforesaid chamber.

4. The combination of two tanks adapted to contain an inflammable liquid and an inert liquid respectively, a pipe connecting said tanks, a cock located in said pipe and adapted to connect the tank containing the inflammable liquid, either with the other tank or with the surrounding air, an outlet pipe through which the inflammable liquid may be discharged from the tank containing it, a cock controlling the discharge of liquid through said outlet pipe, and an operative connection between the two cocks to connect the tanks with one another when the discharge cock is opened, and to connect the tank containing the inflammable liquid, with the air when the discharge cock is closed.

5. The combination of two tanks adapted to contain an inflammable liquid and an inert liquid respectively, a pipe connecting said tanks, a cock located in said pipe and adapted to connect the tank containing the inflammable liquid, either with the other tank or with the outside air, an outlet pipe through which the inflammable liquid may be discharged from the tank containing it, a cock controlling the discharge of liquid through said outlet pipe, an operative connection between the two cocks to connect the tank containing the inflammable liquid with the outside air when the discharge cock is closed, and with the other tank when the discharge cock is opened, and a non-return valve, opening toward the outside air, interposed between the first-named cock and the outside air.

6. The combination of a tank adapted to contain an inflammable liquid, and a pipe through which the liquid may be discharged from said tank, the intake end of said pipe, located within the upper portion of the tank, being made of U-shape to prevent the entrance of water from the outside in case the discharge pipe should be broken.

7. The combination of a storage tank for inflammable liquids, a tank adapted to contain an inert liquid, a pipe connecting said tanks and provided with a siphon bend rising above the second-named tank, a third tank adapted to contain an inert liquid, and a pump having a suction connection to the said third tank and a delivery connection to a point of the pipe which connects the first-named tank with the second-named tank.

8. An apparatus of the class described, comprising a tank adapted to contain an inflammable liquid, a second tank adapted to contain an inert liquid, a pipe connecting said two tanks and provided with a siphon bend rising above the second-named tank, a vacuum-chamber communicating with said pipe at its uppermost point, a third tank adapted to contain an inert liquid, and a pump having a suction connection to said third tank and a delivery connection to said connecting pipe.

9. An apparatus of the class described, comprising a tank adapted to contain an inflammable liquid, a pipe for discharging said liquid from said tank, a jacket for said pipe, a second tank adapted to contain an inert liquid, a pipe connecting said two tanks and provided with a siphon bend rising above the second-named tank, a vacuum-chamber communicating with said jacket and also communicating with said connecting pipe at its siphon bend, a third tank adapted to contain an inert liquid, and a pump having a suction connection to said third tank and a delivery connection to said connecting pipe.

10. An apparatus of the class described, comprising a tank adapted to contain an inflammable liquid, a second tank adapted to contain an inert liquid, a pipe connecting said two tanks and provided with a siphon bend rising above the second-named tank, a vacuum-chamber communicating with said pipe at its siphon bend, and means for producing a partial vacuum in said chamber.

In testimony whereof, I have signed this specification in the presence of two subscribing witnesses.

ERNST HURLBRINK.

Witnesses:
 WOLDEMAR HAUPT,
 HENRY HASPER.